US008112837B1

(12) United States Patent
Lopez

(10) Patent No.: US 8,112,837 B1
(45) Date of Patent: Feb. 14, 2012

(54) VEHICULAR WHEEL CHANGING ASSEMBLY

(76) Inventor: Jose A. Lopez, Miami, FL (US)

( * ) Notice: Subject to any disclaimer, the term of this patent is extended or adjusted under 35 U.S.C. 154(b) by 385 days.

(21) Appl. No.: 12/512,076

(22) Filed: Jul. 30, 2009

(51) Int. Cl.
*B25F 1/00* (2006.01)
*B60S 9/06* (2006.01)

(52) U.S. Cl. .............................. 7/100; 254/126; 254/424

(58) Field of Classification Search ...... 7/100; 254/126, 254/423, 424, DIG. 2
See application file for complete search history.

(56) References Cited

U.S. PATENT DOCUMENTS

| 3,645,501 | A  | * | 2/1972  | Musgrove ..................... 254/126 |
| 4,872,230 | A  | * | 10/1989 | Levine ............................... 7/100 |
| 6,695,289 | B1 | * | 2/2004  | Mickael ......................... 254/122 |
| 6,773,132 | B2 | * | 8/2004  | Gilligan et al. ................ 362/119 |
| 6,832,402 | B1 | * | 12/2004 | Drago et al. ....................... 7/100 |
| 7,611,127 | B1 | * | 11/2009 | Moore .......................... 254/93 R |
| 2004/0125609 | A1 | * | 7/2004  | Gilligan et al. ................ 362/486 |

* cited by examiner

*Primary Examiner* — David B Thomas
(74) *Attorney, Agent, or Firm* — Albert Bordas, P.A.

(57) ABSTRACT

A vehicular wheel changing assembly, consisting of a case assembly housing a transformer. The transformer has electrical connections to at least first and second electrical connectors. The case assembly also houses a cable connector that supplies power to the transformer. The cable connector extends from the one circuit of a vehicle to the first electrical connector. An electrical power gun has an electrical cord having a plug that inserts into the second electrical connector. The electrical power gun further comprises a socket assembly having a plurality of sockets that each mount thereon. At least one of the plurality of different sized sockets is of a cooperative size to fit onto lug nuts of a vehicle wheel assembly. A jack assembly has lifting means to lift a vehicle, whereby the jack assembly has a cooperative head to receive at least one of the plurality of different sized sockets thereon.

20 Claims, 5 Drawing Sheets

VEHICULAR WHEEL CHANGING ASSEMBLY

BACKGROUND OF THE INVENTION

1. Field of the Invention

The present invention relates to tools, and more particularly, to a tool kit used to facilitate the changing of a vehicle wheel assembly.

2. Description of the Related Art

Most people that routinely drive a vehicle, such as an automobile, have experienced a flat tire. For some, changing a flat tire is a simple task and does not require much thought or effort. For other people however, changing a flat tire is a very difficult task. Often the difficulty arises because the person simply does not have sufficient strength to manually remove lug nuts from a wheel, or to manually operate a jack to lift the vehicle. Tools operated by manual force have been developed in the past for changing a flat tire. These tools provide for a number of more or less complicated features that fail to solve the problem in an efficient and economical way. Applicant however, is not aware of an easy-to-transport tool kit used to facilitate the changing of a vehicle wheel assembly having the novel features of the present invention.

SUMMARY OF THE INVENTION

The instant invention is a vehicular wheel changing assembly, consisting of a case assembly housing a transformer. The transformer has transfer means to transfer electrical energy from one circuit to another through inductively coupled conductors. The transformer has electrical connections to at least first and second electrical connectors. The case assembly houses a cable connector that supplies power to the transformer. The cable connector extends from the one circuit of a vehicle to the first electrical connector. The transformer has an activation switch, an illuminating indicator, and first air vents. In the preferred embodiment, the one circuit is a vehicle cigarette lighter socket or vehicle adapter designed to provide electrical power.

The case assembly comprises an exterior top wall, a first front wall, and first and second lateral walls. The case assembly also houses a socket case to store a socket assembly. The case assembly further comprises an interior top wall having at least first and second cooperatively shaped cavities to snugly receive the connector cable and power gun respectively. The case assembly further comprises a base wall, a second front wall, and third and fourth lateral walls. The first and third lateral walls comprise at least one second air vent. The case assembly further comprises at least one handle.

An electrical power gun comprises a body, a handle, and a trigger. The electrical power gun also has an electrical cord having a plug that inserts into the second electrical connector. The electrical power gun further comprises a socket assembly having a plurality of different sized sockets that each mount thereon. At least one of the pluralities of different sized sockets is of a cooperative size to fit onto lug nuts of a vehicle wheel assembly. The socket assembly is housed in the case assembly.

A jack assembly has lifting means to lift a vehicle, whereby the jack assembly has a cooperative head to receive at least one of the pluralities of different sized sockets thereon. The jack assembly has a foot pedal to prevent the jack assembly from falling over when a torque force is applied when operating the electrical power gun onto the jack assembly.

The jack assembly can be a scissor jack assembly or a telescopic jack assembly. The scissor jack assembly comprises a lift plate, a base member, lower scissor arms, upper scissor arms, and an adapter member having a cooperative adapter head to receive at least one of the plurality of different sized sockets thereon. In use, the lift plate is positioned below a chassis section of the vehicle. The telescopic jack assembly comprises a lift plate, a base member, a telescopic base, an intermediate telescopic member, an upper telescopic member, and a bolt head receiving member having the cooperative bolt head to receive at least one of the plurality of different sized sockets thereon. Similarly, in use the lift plate positioned below a chassis section of the vehicle.

It is therefore one of the main objects of the present invention to provide an easy-to-transport tool kit used to facilitate the changing of a vehicle wheel assembly.

It is another object of this invention to provide a vehicular wheel changing assembly consisting of a case assembly housing a transformer and an electrical power gun having a plurality of different sized sockets of a cooperative size to fit onto lug nuts of a vehicle wheel assembly, and further comprising a jack assembly having lifting means to lift a vehicle to change a flat tire.

It is another object of this invention to provide a vehicular wheel changing assembly that is volumetrically efficient for carrying, transporting, and storage within a vehicle.

It is another object of this invention to provide a vehicular wheel changing assembly that is of a durable and reliable construction.

It is yet another object of this invention to provide such an assembly that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED

Embodiment

Figure 1:
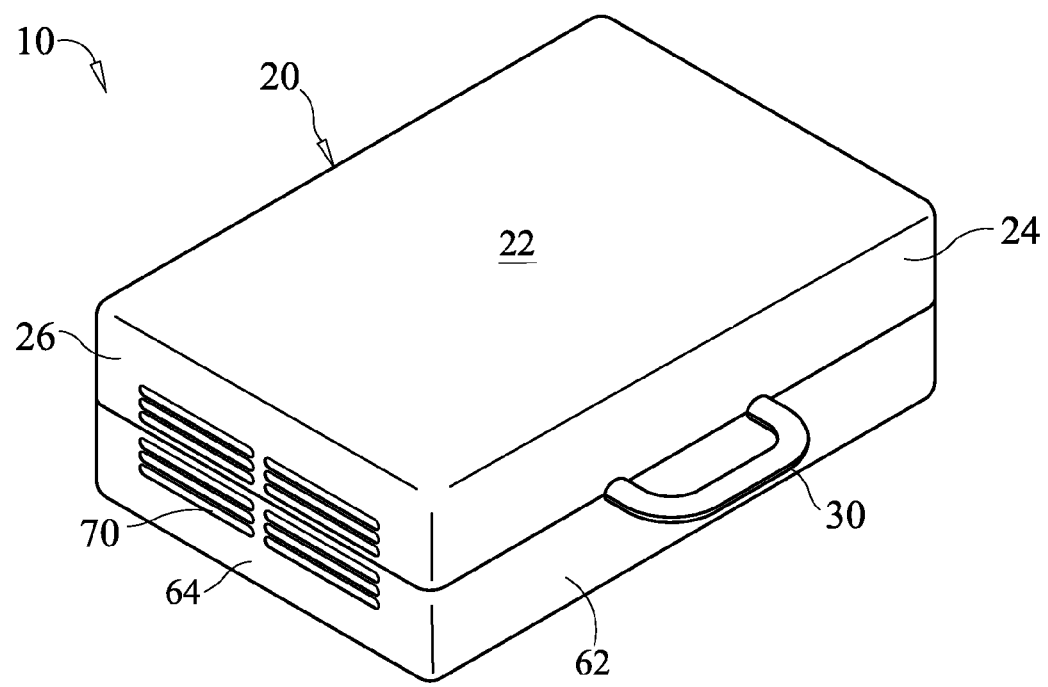
FIG. 1 is an isometric view of the case assembly closed.

Referring now to the drawings, the present invention is generally referred to with numeral 10. It can be observed that it basically includes case assembly 20, transformer 80, power gun 100, scissor jack assembly 130, and telescopic jack assembly 230.

Figure 2:
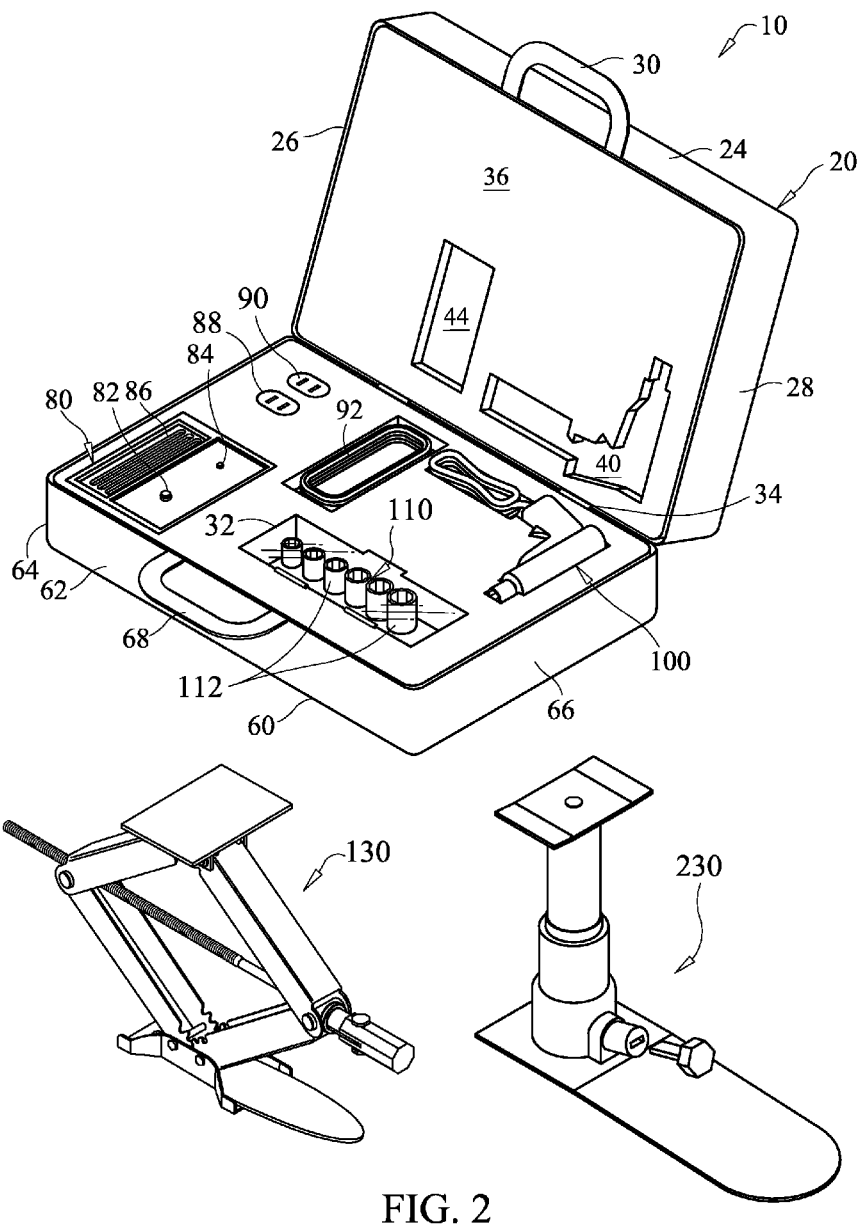
FIG. 2 is an isometric view of the present invention with the case assembly open including the scissor jack and telescopic jack assemblies.

As seen in FIGS. 1 and 2, instant invention 10 is a vehicular wheel changing assembly, comprising case assembly 20 that houses transformer 80. Instant invention 10 further comprises a jack assembly having lifting means to lift a vehicle. In the preferred embodiment, the jack assembly can be scissor jack assembly 130 or telescopic jack assembly 230. Although not illustrated, it is noted that transformer 80 has transfer means to transfer electrical energy from one circuit to another through inductively coupled conductors. Transformer 80 has electrical connections, not seen, to first and second electrical connectors 88 and 90 that are mounted within case assembly 20. Case assembly 20 also houses cable connector 92 that supplies power to transformer 80. Transformer 80 has on/off activation switch 82, light emitting diode illuminating indicator 84, and air vents 86.

Case assembly 20 comprises exterior top wall 22, first front wall 24, and first and second lateral walls 26 and 28. Case assembly 20 further comprises interior top wall 36 having at least first and second cooperatively shaped cavities defined as cable cavity 44 and power gun cavity 40 to snugly receive connector cable 92 and power gun 100 respectively. In a preferred embodiment, interior top wall 36 and at least first and second cooperatively shaped cavities 44 and 40 can be made of a durable foam or plastic material. Case assembly 20 further comprises base wall 60, second front wall 62, and third and fourth lateral walls 64 and 66. First and third lateral walls 26 and 64 comprise at least one air vent 70. Case assembly 20 also houses socket case 32 to store socket assembly 110 having sockets 112. Case assembly 20 further comprises handles 30 and 68, and hinges 34.

Figure 3:
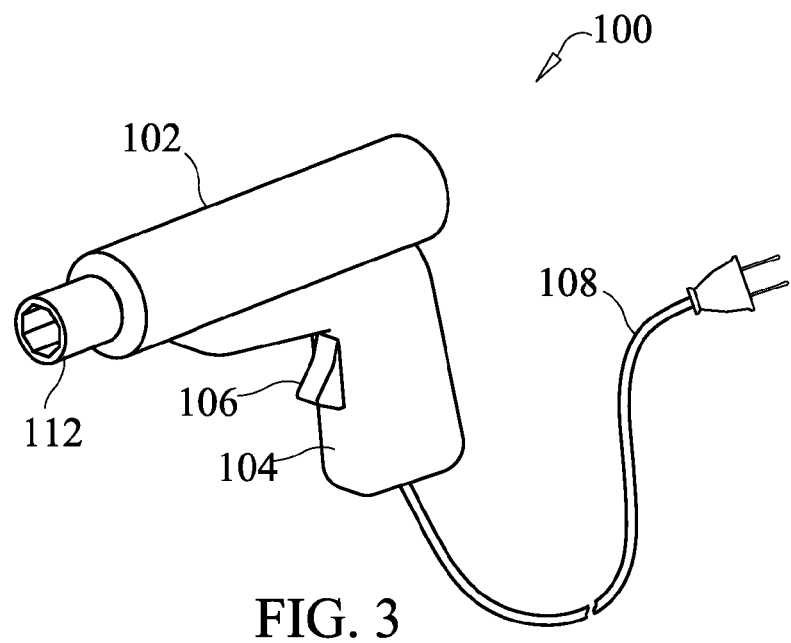
FIG. 3 is an isometric view of the power gun.

As seen in FIG. 3, power gun 100 is electrical and comprises body 102, handle 104, and trigger 106. Power gun 100 also has electrical cord 108 having a plug that inserts into electrical connector 88. Power gun 100 further comprises socket assembly 110 (seen in FIG. 2) having a plurality of different sized sockets 112 that each mount thereon.

Figure 4:
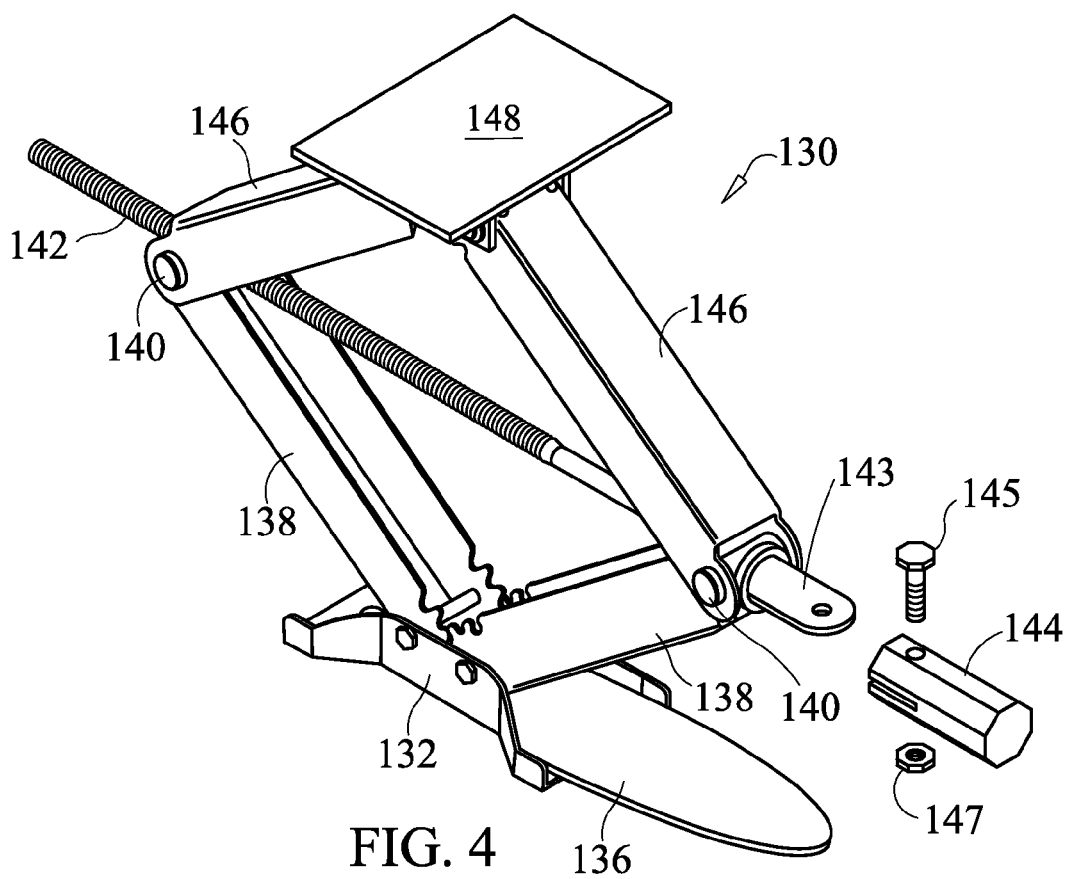
FIG. 4 is an isometric view of the scissor jack assembly.
Figure 6:
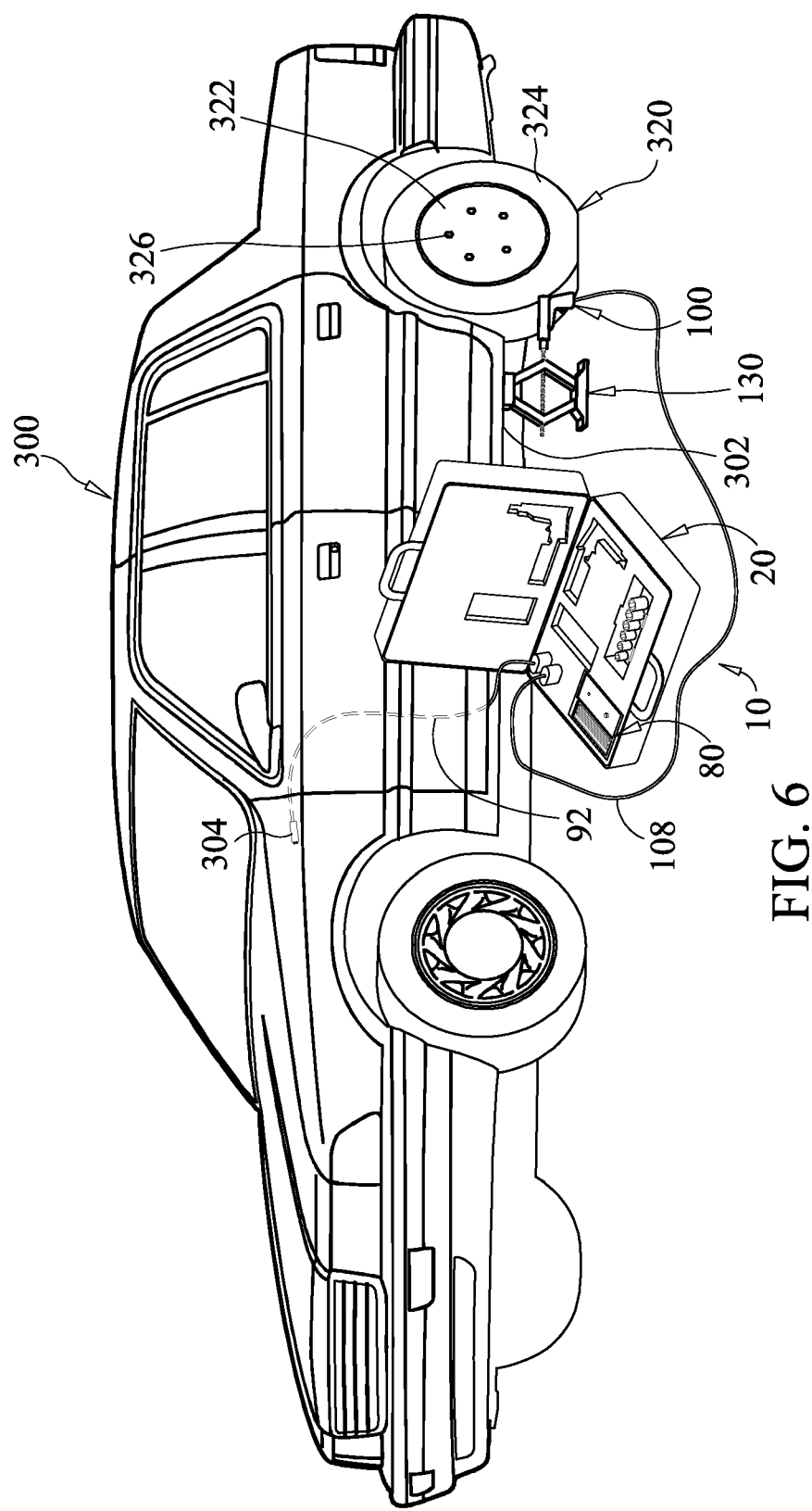
FIG. 6 is an isometric view of the present invention in position to be operated to lift the vehicle and remove and replace a flat tire.

As seen in FIG. 4, scissor jack assembly 130 has adapter head 144 to receive at least one of the pluralities of different sized sockets 112 thereon. Scissor jack assembly 130 has foot pedal 136 to prevent scissor jack assembly 130 from falling over when a torque force is applied when operating power gun 100 onto scissor jack assembly 130. Scissor jack assembly 130 comprises lift plate 148, base member 132, lower scissor arms 138, upper scissor arms 146, and bolt 142 having adapter member 143 with adapter head 144 to receive at least one of the plurality of different sized sockets 112 thereon. Adapter head 144 mounts onto adapter member 143 with bolt 145 and nut 147. Pins 140 connect lower scissor arms 138 and upper scissor arms 146. As best seen in FIG. 6, in use lift plate 148 is positioned below chassis section 302 of vehicle 300.

Figure 5:
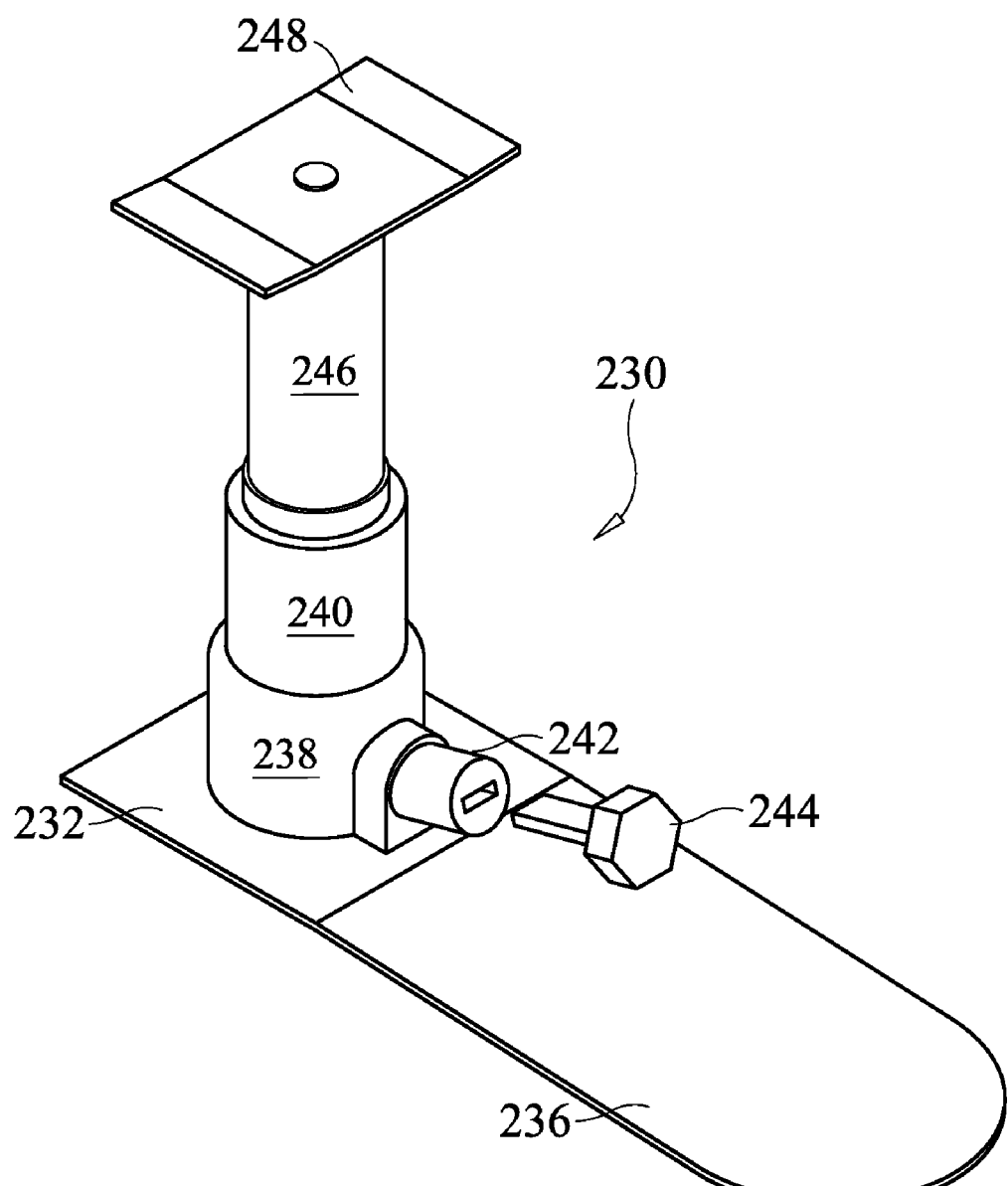
FIG. 5 is an isometric view of the telescopic jack assembly.

As seen in FIG. 5, telescopic jack assembly 230 has a cooperative bolt head 244 to receive at least one of the pluralities of different sized sockets 112 thereon. Telescopic jack assembly 230 has foot pedal 236 to prevent telescopic jack assembly 230 from falling over when a torque force is applied when operating power gun 100 onto telescopic jack assembly 230. Telescopic jack assembly 230 comprises lift plate 248, base member 232, telescopic base 238, intermediate telescopic member 240, upper telescopic member 246, and bolt head receiving member 242 with cooperative bolt head 244 to receive at least one of the plurality of different sized sockets 112 thereon. Similarly, in use lift plate 248 is positioned below chassis section 302 of vehicle 300.

Although not illustrated, it is noted that socket case 32 may also store adapter head 144, bolt 145, nut 147, and bolt head 244. In addition, socket case 32 may also store a plurality of adapter heads 144 and bolt heads 244 so that a user can match each to lug nuts 326 to reduce having to switch sizes while changing a wheel assembly as illustrated in FIG. 6.

As best seen in FIG. 6, vehicular wheel changing assembly 10 consists of case assembly 20 housing transformer 80. Power gun 100 has a plurality of different sized sockets 112 of a cooperative size to fit onto lug nuts 326 of wheel assembly 320. As seen in this illustration, scissor jack assembly 130 has lifting means to lift vehicle 300 by chassis 302 to change flat tire 324 mounted on wheel 322.

To change wheel 322 having flat tire 324 mounted thereon, a user connects cable connector 92 that extends from a circuit of vehicle 300 into electrical connector 90. In the preferred embodiment, the circuit is a vehicle cigarette lighter socket or vehicle adapter 304 designed to provide electrical power. The user then plugs the plug of electrical cord 108 for power gun 100 into electrical connector 88. The user then identifies a proper size of adapter head 144 that matches to lug nuts 326. The user then positions scissor jack assembly 130 under chassis 302 of vehicle 300. The user identifies a proper size socket 112 to use upon adapter head 144. The user then steps on foot pedal 136 and mounts socket 112 onto adapter head 144. Utilizing power gun 100, the user raises vehicle 300 to a desired height to safely remove wheel 322 with flat tire 324 mounted thereon. The user mounts socket 112 onto a first lug nut 326. Utilizing power gun 100, the user unscrews each lug nut 326 to safely remove wheel 322 with flat tire 324 mounted thereon. The user then mounts a spare tire thereon in reverse order.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A vehicular wheel changing assembly, comprising:
   A) a case assembly housing a transformer, said transformer having transfer means to transfer electrical energy from one circuit to another through inductively coupled conductors, said transformer having electrical connections to at least first and second electrical connectors, said case assembly also housing a cable connector that supplies power to said transformer, said cable connector extending from said one circuit of a vehicle to said first electrical connector;
   B) an electrical power gun comprising a body, a handle, and a trigger, said electrical power gun having an electrical cord having a plug that inserts into said second electrical connector, said electrical power gun further comprising a socket assembly having a plurality of different sized sockets that each mount thereon, at least one of said plurality of different sized sockets of a cooperative size to fit onto lug nuts of a vehicle wheel assembly, said socket assembly housed within said case assembly; and
   C) a jack assembly having lifting means to lift a vehicle, said jack assembly having a cooperative head to receive at least one of said plurality of different sized sockets thereon, said jack assembly having a foot pedal to prevent said jack assembly from falling over when a torque force is applied when operating said electrical power gun onto said jack assembly.

2. The vehicular wheel changing assembly set forth in claim 1, further characterized in that said transformer has an activation switch, an illuminating indicator, and air vents.

3. The vehicular wheel changing assembly set forth in claim 1, further characterized in that said one circuit is a vehicle cigarette lighter socket or a vehicle adapter designed to provide electrical power.

4. The vehicular wheel changing assembly set forth in claim 1, further characterized in that said case assembly comprises an exterior top wall, a first front wall, and first and second lateral walls.

5. The vehicular wheel changing assembly set forth in claim 4, further characterized in that said case assembly further comprises an interior top wall having at least first and second cooperatively shaped cavities to snugly receive said connector cable and said power gun respectively.

6. The vehicular wheel changing assembly set forth in claim 5, further characterized in that said case assembly further comprises a base wall, a second front wall, and third and fourth lateral walls, said first and third lateral walls comprise at least one air vent.

7. The vehicular wheel changing assembly set forth in claim 6, further characterized in that said case assembly further comprises at least one handle.

8. A vehicular wheel changing assembly, comprising:
   A) a case assembly housing a transformer, said transformer having transfer means to transfer electrical energy from one circuit to another through inductively coupled conductors, said transformer having electrical connections to at least first and second electrical connectors, said case assembly also housing a cable connector that supplies power to said transformer, said cable connector extending from said one circuit of a vehicle to said first electrical connector, said transformer has an activation switch, an illuminating indicator, and first air vents;
   B) an electrical power gun comprising a body, a handle, and a trigger, said electrical power gun having an electrical cord having a plug that inserts into said second electrical connector, said electrical power gun further comprising a socket assembly having a plurality of different sized sockets that each mount thereon, at least one of said plurality of different sized sockets of a cooperative size to fit onto lug nuts of a vehicle wheel assembly, said socket assembly housed within said case assembly; and
   C) a jack assembly having lifting means to lift a vehicle, said jack assembly having a cooperative head to receive at least one of said plurality of different sized sockets thereon, said jack assembly having a foot pedal to prevent said jack assembly from falling over when a torque force is applied when operating said electrical power gun onto said jack assembly.

9. The vehicular wheel changing assembly set forth in claim 8, further characterized in that said one circuit is a vehicle cigarette lighter socket or vehicle adapter designed to provide electrical power.

10. The vehicular wheel changing assembly set forth in claim 8, further characterized in that said case assembly comprises an exterior top wall, a first front wall, and first and second lateral walls.

11. The vehicular wheel changing assembly set forth in claim 10, further characterized in that said case assembly further comprises an interior top wall having at least first and second cooperatively shaped cavities to snugly receive said connector cable and said power gun respectively.

12. The vehicular wheel changing assembly set forth in claim 11, further characterized in that said case assembly further comprises a base wall, a second front wall, and third and fourth lateral walls, said first and third lateral walls comprise at least one second air vent.

13. The vehicular wheel changing assembly set forth in claim 12, further characterized in that said case assembly further comprises at least one handle.

14. A vehicular wheel changing assembly, consisting of:
   A) a case assembly housing a transformer, said transformer having transfer means to transfer electrical energy from one circuit to another through inductively coupled conductors, said transformer having electrical connections to at least first and second electrical connectors, said case assembly also housing a cable connector that supplies power to said transformer, said cable connector extending from said one circuit of a vehicle to said first electrical connector, said transformer has an activation switch, an illuminating indicator, and first air vents, said one circuit is a vehicle cigarette lighter socket or vehicle adapter designed to provide electrical power;
   B) an electrical power gun comprising a body, a handle, and a trigger, said electrical power gun having an electrical cord having a plug that inserts into said second electrical connector, said electrical power gun further comprising a socket assembly having a plurality of different sized sockets that each mount thereon, at least one of said plurality of different sized sockets of a cooperative size to fit onto lug nuts of a vehicle wheel assembly, said socket assembly housed within said case assembly; and
   C) a jack assembly having lifting means to lift a vehicle, said jack assembly having a cooperative head to receive at least one of said plurality of different sized sockets thereon, said jack assembly having a foot pedal to prevent said jack assembly from falling over when a torque force is applied when operating said electrical power gun onto said jack assembly.

15. The vehicular wheel changing assembly set forth in claim 14, further characterized in that said case assembly comprises an exterior top wall, a first front wall, and first and second lateral walls.

16. The vehicular wheel changing assembly set forth in claim 15, further characterized in that said case assembly further comprises an interior top wall having at least first and second cooperatively shaped cavities to snugly receive said connector cable and said power gun respectively.

17. The vehicular wheel changing assembly set forth in claim 16, further characterized in that said case assembly further comprises a base wall, a second front wall, and third and fourth lateral walls, said first and third lateral walls comprise at least one second air vent.

18. The vehicular wheel changing assembly set forth in claim 17, further characterized in that said case assembly further comprises at least one handle.

19. The vehicular wheel changing assembly set forth in claim 14, further characterized in that said jack assembly is a scissor jack assembly comprising a lift plate, a base member, lower scissor arms, upper scissor arms, and a adapter member with said cooperative head to receive at least one of said plurality of different sized sockets thereon, said lift plate positioned below a chassis section of said vehicle.

20. The vehicular wheel changing assembly set forth in claim 14, further characterized in that said jack assembly is a telescopic jack assembly comprising a lift plate, a base member, a telescopic base, an intermediate telescopic member, an upper telescopic member, and a bolt head receiving member with said cooperative bolt head to receive at least one of said plurality of different sized sockets thereon, said lift plate positioned below a chassis section of said vehicle.

* * * * *